United States Patent
Vogel

(10) Patent No.: US 10,718,935 B2
(45) Date of Patent: Jul. 21, 2020

(54) ENDOSCOPE AND RELAY LENS SYSTEM FOR TRANSMITTING AN IMAGE

(71) Applicant: Karl Storz SE & Co. KG, Tuttlingen (DE)

(72) Inventor: Walter Vogel, Tuttlingen (DE)

(73) Assignee: Karl Storz SE & Co. KG, Tuttlingen (DE)

(*) Notice: Subject to any disclaimer, the term of this patent is extended or adjusted under 35 U.S.C. 154(b) by 111 days.

(21) Appl. No.: 15/673,659

(22) Filed: Aug. 10, 2017

(65) Prior Publication Data

US 2018/0059400 A1    Mar. 1, 2018

(30) Foreign Application Priority Data

Aug. 24, 2016    (DE) .................. 10 2016 115 738

(51) Int. Cl.
  *G02B 23/24*    (2006.01)
  *G02B 9/00*    (2006.01)
  *G02B 27/00*    (2006.01)

(52) U.S. Cl.
  CPC ..... *G02B 23/2446* (2013.01); *G02B 27/0025* (2013.01)

(58) Field of Classification Search
  CPC .................. G02B 13/0095; G02B 23/2446
  USPC ........................... 359/434, 435, 754
  See application file for complete search history.

(56) References Cited

U.S. PATENT DOCUMENTS

| | | |
|---|---|---|
| 5,097,359 A | 3/1992 | McKinley |
| 5,142,410 A | 8/1992 | Ono et al. |
| 5,568,312 A * | 10/1996 | Horton ................. G02B 13/18 359/362 |
| 5,805,345 A * | 9/1998 | Nagaoka ........... G02B 13/0095 359/434 |
| 5,933,275 A | 8/1999 | Igarashi |
| 2013/0253273 A1* | 9/2013 | Duckett, III ........... A61B 1/002 600/163 |
| 2019/0121117 A1* | 4/2019 | Amanai ................. A61B 1/055 |

FOREIGN PATENT DOCUMENTS

| | | |
|---|---|---|
| DE | 102012200146 A1 | 7/2013 |
| GB | 1534541 A | 12/1978 |

OTHER PUBLICATIONS

German Search Report Application No. 10 2016 115 738.4 Completed Date: Jun. 20, 2017; dated Jun. 27, 2017 10 Pages.

* cited by examiner

*Primary Examiner* — Mahidere S Sahle
(74) *Attorney, Agent, or Firm* — Whitmyer IP Group LLC

(57) ABSTRACT

A relay lens system for transmitting an image from a distal end of the relay lens systems to a proximal end of the relay lens system including a plurality of imaging devices with in each case one or more lenses, wherein each imaging device of the plurality of imaging devices images a real intermediate image distal to the imaging device into a further real intermediate image proximal to the imaging device. The plurality of imaging devices has a plurality of first imaging devices and a second imaging device. The first imaging devices each have a chromatic aberration. The chromatic aberration of the first imaging devices is corrected by the second imaging device. The second imaging device is arranged between the first imaging devices.

18 Claims, 2 Drawing Sheets

ENDOSCOPE AND RELAY LENS SYSTEM FOR TRANSMITTING AN IMAGE

TECHNICAL FIELD

The present invention relates to a relay lens system for transmitting an image, and to an endoscope having such a relay lens system.

BACKGROUND

With advances in semiconductor technology, increasingly smaller and more efficient image sensors and cameras become possible. For this reason, an increasing number of endoscopes have an image sensor at the distal end ("chip-on-the-tip"). Yet, there continue to be numerous applications in which, for various reasons, an image generated by an objective is intended to be first transmitted from the distal end to the proximal end of an endoscope by way of a relay lens system. At the proximal end of the endoscope, the transmitted image can be observed directly through an eyepiece or can be captured by a camera. For this reason, relay lens systems are likewise subject to constant improvement and further development so as to improve the imaging properties and/or to lower the production costs.

GB 1 534 541 describes a relay lens system, in which each inversion is corrected with respect to chromatic aberration.

In U.S. Pat. No. 5,097,359 describes a configuration of a relay lens for an endoscope.

U.S. Pat. No. 5,142,410 describes relay lens systems, in which individual inversions are corrected.

U.S. Pat. No. 5,933,275 describes a relay lens system composed of a plurality of relay lens units. With respect to the longitudinal chromatic aberration, at least one relay lens unit A is undercorrected, and at least one relay lens unit B is overcorrected such that the undercorrected longitudinal chromatic aberration and the overcorrected longitudinal chromatic aberration cancel each other out (column 2, line 65 to column 3, line 7).

It is an object of the present invention to provide an improved relay lens system and an improved endoscope.

SUMMARY

This object is achieved by way of the subject matters of the independent claims.

Further developments are specified in the dependent claims.

A relay lens system for transmitting an image from a distal end of the relay lens system to a proximal end of the relay lens system comprises a plurality of imaging devices each having one or more lenses, wherein each imaging device of the plurality of imaging devices images a real intermediate image distal to the imaging device into a further real intermediate image proximal to the imaging device, wherein the plurality of imaging devices comprises a plurality of first imaging devices and a second imaging device, wherein the first imaging devices each have a chromatic aberration, wherein the chromatic aberration of the first imaging devices is corrected by the second imaging device, and wherein the second imaging device is arranged between the first imaging devices.

The relay lens system is provided and configured in particular for an endoscope. The relay lens system is provided and configured in particular to image a real intermediate image, produced by an objective of an endoscope, near the distal end of the endoscope and at the distal end of the relay lens system by way of a plurality of further real intermediate images into a last, most proximal real intermediate image at the proximal end of the relay lens system and near the proximal end of the endoscope. To this end, the imaging devices of the relay lens system are arranged one after another. The last real intermediate image can then be observed directly with the human eye through an eyepiece or be captured by a camera or be imaged, by way of a further objective or a different imaging device, into the light-sensitive layer of an image sensor or into the light-sensitive layers of a plurality of image sensors.

An imaging device within the meaning of the present text is an imaging device that images a first real intermediate image distal to the imaging device into a second real intermediate image proximal to the imaging device, without there being a further, third real intermediate image between the first real intermediate image and the second real intermediate image. The individual imaging devices are frequently referred to as inverting means, because every imaging device effects an inversion of the intermediate image, such that the real intermediate image proximal to the imaging device is inverted with respect to the real intermediate image distal to the imaging device.

The first imaging devices are in particular identical to one another, i.e. are indistinguishable aside from differences caused by manufacturing tolerances. The chromatic aberration of each first imaging device comprises in particular a longitudinal chromatic aberration, a lateral chromatic aberration and/or a chromatic difference of magnification. The first imaging devices are undercorrected with respect to this chromatic aberration, i.e. the chromatic aberration caused due to a component part of the first imaging device is not, or only partially, corrected by a different component part of the first imaging device.

The second imaging device is overcorrected in particular in as far as not only a chromatic aberration of a component part of the second imaging device is corrected, but also the chromatic aberration of the first imaging devices. To this end, the second imaging device has, for example, a correction device which partially or completely corrects the chromatic aberration of the first imaging devices and of the remaining component parts of the second imaging device. The second imaging device thus has, by itself, a chromatic aberration which is opposite to the chromatic aberration of the first imaging devices and which partially, largely or completely compensates for the chromatic aberration of the first imaging devices. As a result, the entire relay lens system is corrected in particular with respect to two or three wavelengths.

The second imaging device is arranged in particular in the center between the first imaging devices. The relay lens system in particular has an even number of (for example two, four, six or eight) first imaging devices, wherein in each case half the first imaging devices are arranged distal and proximal to the second imaging device. In this case, the first imaging devices are arranged in particular symmetrically with respect to the second imaging device.

The relay lens system in particular has an optical axis that is at the same time the optical axis of all imaging devices. The first imaging devices are in particular arranged mirror-symmetrically with respect to a plane of symmetry, wherein the plane of symmetry is orthogonal with respect to the optical axis of the second imaging device or with respect to the optical axis of the relay lens system.

In a relay lens system as is described here, the second imaging device is in particular mirror-symmetric with respect to a plane of symmetry, which is orthogonal with respect to the optical axis of the second imaging device.

In a relay lens system as is described here, in particular each first imaging device comprises only two identical lenses.

Each first imaging device in particular comprises only two identical rod lenses.

In a relay lens system as is described here, each first imaging device comprises in particular two rod lenses, with each rod lens being mirror-symmetric with respect to a plane of symmetry that is orthogonal with respect to the optical axis of the first imaging device.

In a relay lens system as is described here, each first imaging device includes in particular only a single optical transparent material.

In a relay lens system as is described here, each first imaging device is in particular entirely uncorrected with respect to chromatic aberration.

In a relay lens system as is described here, the second imaging device has in particular two rod lenses and, between the two rod lenses, a correction device for correcting a chromatic aberration of the first imaging devices and of the rod lenses of the second imaging device.

The two rod lenses of the second imaging device are in particular identical. The two rod lenses of the second imaging device in particular have only a single optically transparent material. The two rod lenses of the second imaging device are in particular entirely uncorrected with respect to chromatic aberration.

The correction device can be provided and configured for correcting one or more different types of chromatic aberrations of the first imaging devices and of the rod lenses of the second imaging device. The correction device can be arranged to be spatially at a distance from both rod lenses of the second imaging device. Alternatively, the correction device can be cemented together with one or both rod lenses of the second imaging device. The second imaging device has in particular only the two rod lenses and the correction device between the two rod lenses, i.e. no further optically effective devices.

A correction of chromatic aberrations of a relay lens system in an imaging device, specifically the second imaging device, can reduce the production costs of the relay lens system. In particular, the undercorrected or entirely uncorrected first imaging devices can each have a particularly simple structure or construction, and thus particularly low production costs.

The arrangement of the overcorrected second imaging device in the center of the relay lens system can permit a particularly effective correction of chromatic aberration and/or other aberrations.

Configuring the second imaging device with a correction device between two rod lenses can permit a particularly simple construction and production of the second imaging device. In particular, the two rod lenses of the second imaging device can be configured in each case without cementing lenses together and thus in a particularly simple manner.

In a relay lens system as is described here, each of the two rod lenses of the second imaging device is in particular mirror-symmetric with respect to a plane of symmetry that is orthogonal with respect to the optical axis of the second imaging device.

In a relay lens system as is described here, the correction device comprises in particular a mirror-symmetric group of a plurality of lenses, which are cemented together.

In a relay lens system as is described here, the correction device is in particular mirror-symmetric with respect to a plane of symmetry that is orthogonal to the optical axis of the second imaging device.

A mirror-symmetric configuration of the rod lenses of the second imaging device and/or the correction device of the second imaging device and/or a part of the correction device and/or the entire second imaging device can reduce the probability of an error occurring during the production of the relay lens system.

In a relay lens system as is described here, the correction device comprises in particular two identical and mirror-symmetrically arranged groups of in each case a plurality of lenses, which are cemented together.

In a relay lens system as is described here, the two identical and mirror-symmetrically arranged groups are attached to surfaces of a plane plate that face away from one another.

Alternatively, the two identical and mirror-symmetrically arranged groups are arranged at a distance from one another.

In a relay lens system as is described here, each first imaging device comprises in particular two rod lenses, or consists of two rod lenses, wherein said two rod lenses of each first imaging device are identical to the rod lenses of the second imaging device.

The two rod lenses of each first imaging device are identical to the two rod lenses of the second imaging device in particular in as far as they have identical properties and are indistinguishable aside from differences caused by production tolerances.

The use of identical rod lenses both for the undercorrected first imaging devices and for the overcorrected second imaging device can increase the number of identical parts and reduce the number of different part types and thus lower production costs. In addition, the risk of mistaking one for another and thus the risk of incorrect assembly or incorrect production are further reduced.

In a relay lens system as is described here, the second imaging device comprises in particular a plurality of lenses, which are cemented together.

Each lens has in particular only a single optically transparent material and thus homogeneous optical properties. One or more lenses of the second imaging device can be rod lenses.

In a relay lens system as is described here, each first imaging device has in particular a rod lens or a different lens made of a glass having a refractive index that is not less than 1.60 and not greater than 1.65, and an Abbe number that is not less than 48 and not greater than 52 or 54.

Glasses with said properties have at the same time a relatively great refractive index and a relatively lower dispersion. For this reason, they produce lower chromatic aberrations than many other glasses.

In a relay lens system as is described here, each first imaging device has in particular a rod lens made of a material that does not contain lead.

In particular, each first imaging device has only lenses of one material or of multiple materials that do not contain lead. In particular, the second imaging device also has only lenses of materials that contain no lead.

The material or the materials contain no lead in particular as regards the production tolerances. In particular, the material contains lead if at all in the form of undesired or unwanted contamination in a concentration that does not influence or does not significantly influence the properties of the material.

In a relay lens system as is described here, the ratio between the diameter of a rod lens and the radius of curvature of the light entry and exit surfaces of the rod lens is in particular not less than 0.3 and not greater than 0.55.

An observation system comprises an objective for producing a real intermediate image, a relay lens system, as is described here, for producing a further real intermediate image from the real intermediate image produced by the objective, and an eyepiece for producing a virtual image, which is capturable by a camera or perceivable by a human eye, from the further real intermediate image.

An observation system as is described here comprises in particular exactly one relay lens system or two or more relay lens systems, as are described here.

In an observation system as is described here, the objective has in particular one or more aspherical lenses.

An aspherical lens is a lens having one light entry or exit surface that does not have the shape of a section of a spherical surface.

In an observation system as is described here, the aspherical lens or one of a plurality of aspherical lenses of the objective is in particular a meniscus lens.

In an observation system as is described here, the eyepiece has in particular one or more aspherical lenses.

In an observation system as is described here, the aspherical lens or one of a plurality of aspherical lenses of the eyepiece is in particular a meniscus lens.

An endoscope comprises a relay lens system, as is described here.

An endoscope as is described here comprises in particular exactly one relay lens system or a plurality of relay lens systems.

A plurality of relay lens systems are arranged in particular one behind the other along a single optical axis.

An endoscope as is described here comprises in particular an objective with one or more aspherical lenses.

In an endoscope as is described here, the aspherical lens or one of a plurality of aspherical lenses of the objective is in particular a meniscus lens.

An endoscope as is described here comprises in particular an eyepiece having one or more aspherical lenses.

The aspherical lens or one of a plurality of aspherical lenses of the eyepiece of the endoscope is in particular a meniscus lens.

BRIEF DESCRIPTION OF THE DRAWINGS

Embodiments will be explained in more detail below with reference to the attached figures, in which.

DETAILED DESCRIPTION

Figure 1:
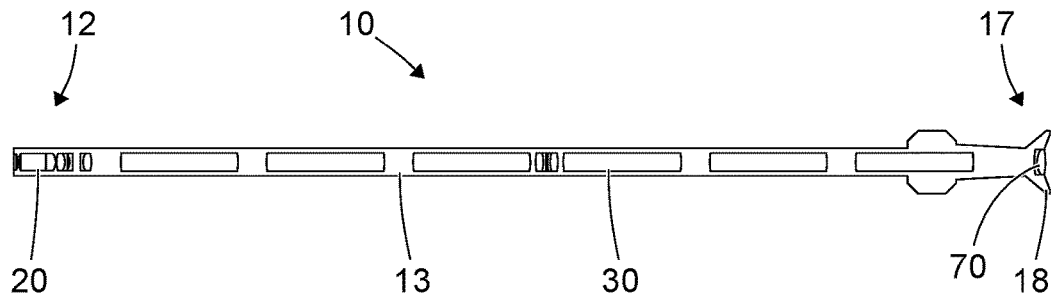
FIG. 1 shows a schematic illustration of an endoscope.

FIG. 1 shows a schematic illustration of an endoscope 10 with a distal end 12 (in the figures: left) and a long, straight shaft 13, which extends from the distal end 12 to a proximal end 17 (in the figures: right) of the endoscope 10. The proximal end 17 of the endoscope 10 is formed by an eyecup 18.

The endoscope 10 comprises an objective 20 at the distal end 12, a relay lens system 30, which is arranged primarily in the shaft 13 of the endoscope 10, and an eyepiece 70, which is arranged in the center of the eyecup 18. The objective 20, the relay lens system 30 and the eyepiece 70 form an observation system for transmitting light, which comes from an observed object near the distal end 12 of the endoscope 10, to an eye of an observer or a camera that can be coupled to the proximal end 17, in particular the eyecup 18, of the endoscope 10.

Figure 2:
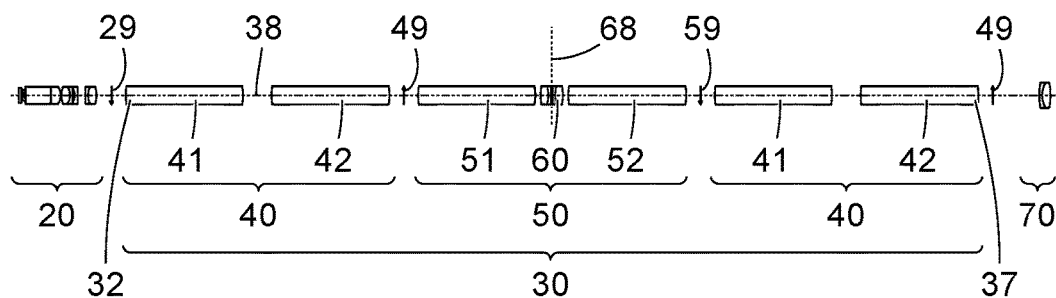
FIG. 2 shows a schematic illustration of an observation system of an endoscope.

FIG. 2 shows a schematic illustration of the observation system of the objective 20, the relay lens system 30 and the eyepiece 70 of the endoscope of FIG. 1. The relay lens system 30 has an optical axis 38, which is at the same time the optical axis of the objective 20, of the eyepiece 70 and of all optical components of the relay lens system 30.

The relay lens system 30 comprises a plurality of imaging devices 40, 50 which are arranged one behind the other. Each imaging device 40, 50 produces, from a real intermediate image 29, 49, 59 distal to the imaging device 40, 50, a further real intermediate image 49, 59 proximal to the imaging device 40, 50. Since each imaging device 40, 50 inverts the intermediate image 29, 49, 59 (i.e. left and right and up and down are swapped), the imaging devices 40, 50 are also often referred to as inverting means.

The relay lens system 30 comprises two first imaging devices 40, which are arranged symmetrically with respect to the second imaging device 50. A first imaging device 40 is arranged distal to the second imaging device 50, and a further first imaging device 40 is arranged proximal to the second imaging device 50. The distal end of the distal first imaging device 40 at the same time forms the distal end 32 of the relay lens system 30. The proximal end of the proximal first imaging device 40 at the same time forms the proximal end 37 of the relay lens system 30.

The objective 20 images an object (not illustrated in FIG. 2) distal to the objective 20 (in the figures: left) into a first real intermediate image 29 proximal to the objective 20 and distal to the distal end 32 of the relay lens system 30. The distal first imaging device 40 that follows the objective 20 images the real intermediate image 29 into a second real intermediate image 49. The second imaging device 50 images the second real intermediate image distal to the second imaging device 50 into a further real intermediate image 59 proximal to the second imaging device 50. The proximal first imaging device 40 between the second imaging device 50 and the eyepiece 70 images the real intermediate image 59 into a last real intermediate image 49 proximal to the proximal end 37 of the relay lens system 30 and distal to the eyepiece 70. From the most proximal real intermediate image 49, the eyepiece 70 produces a virtual image that can be observed directly with the human eye or can be captured by way of a camera.

Each first imaging device 40 comprises only two identical rod lenses 41, 42. Each rod lens 41, 42 is mirror-symmetric with respect to a plane of symmetry that is orthogonal with respect to the optical axis 38. The rod lenses 41, 42 of the first imaging devices 40 each have a single material, in particular a glass having a refractive index in the range of 1.60 to 1.65 and an Abbe number in the range of 48 to 52 or 54. The rod lenses 41, 42 of the first imaging devices 40 are uncorrected with respect to chromatic aberrations. Since the rod lenses 41, 42 of the first imaging devices 40 have no cemented lenses, they can be produced with little effort and cost-effectively.

The second imaging device 50 comprises two identical rod lenses 51, 52 and a correction device 60 between the rod lenses 51, 52. The rod lenses 51, 52 of the second imaging device 50 each have a single optically transparent material, in particular a glass having a refractive index in the range of 1.60 to 1.65 and an Abbe number in the range of 48 to 52 or 54. The rod lenses 51, 52 of the second imaging device 50 have no cemented lenses. The rod lenses 51, 52 are identical. Each rod lens 51, 52 of the second imaging device 50 is mirror-symmetric with respect to a plane of symmetry that is orthogonal with respect to the optical axis 38. The rod lenses 51, 52 of the second imaging device 50 are identical to the rod lenses 41, 42 of the first imaging devices 40.

The first imaging devices 40 and the rod lenses 51, 52 of the second imaging device 50 are arranged mirror-symmetrically with respect to a plane of symmetry 68 that is orthogonal with respect to the optical axis 38. In the illustrated example, the correction device 60 is also mirror-symmetric with respect to the plane of symmetry 68. As a result, the entire relay lens system 30 is mirror-symmetric with respect to the plane of symmetry 68.

The correction device 60 is provided and configured to correct not only the chromatic aberrations (one or multiple types, in particular longitudinal chromatic aberration, lateral chromatic aberration, chromatic difference of magnification) of the rod lenses 51, 52 of the second imaging device 50, but also of the first imaging devices 40. To this extent, the first imaging devices 40 are undercorrected, and the second imaging device 50 is overcorrected.

Figure 3:
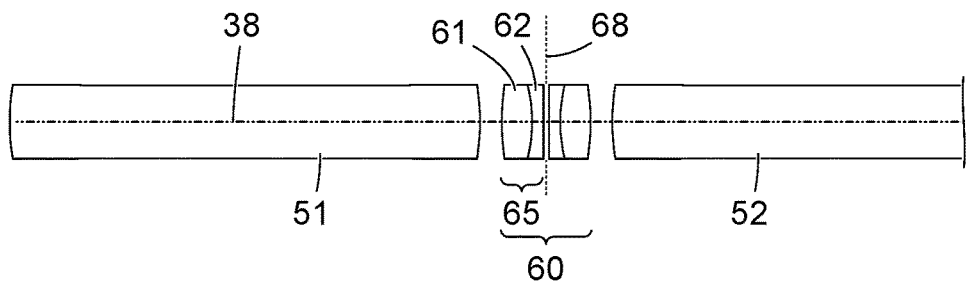
FIG. 3 shows a schematic illustration of a second imaging device of the observation system of FIG. 2.

FIG. 3 shows a schematic enlarged illustration of part of the second imaging device 50, in particular of the entire distal rod lens 51, the correction device 60, and part of the proximal rod lens 52.

The correction device 60 comprises four lenses 61, 62 in two identical groups 65, which are arranged mirror-symmetrically with respect to the plane of symmetry 68. The lenses 61, 62 of one group are in each case cemented together. The two groups 65 are arranged at a distance from one another. The mutually facing light entry or exit surfaces of the lenses 62 are each planar and parallel with respect one another.

Figure 4:
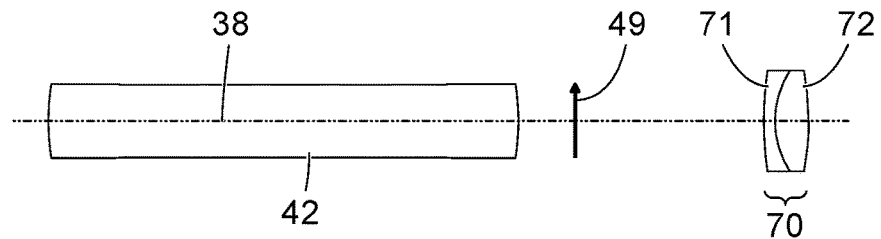
FIG. 4 shows a schematic illustration of a proximal end of the observation system from FIG. 2.

FIG. 4 shows a schematic illustration of the eyepiece 70 and of a part, specifically the proximal rod lens 42, of the proximal first imaging device 40.

The eyepiece 70 comprises two lenses 71, 72, which are cemented together and thus form one group. One lens 71 of the eyepiece 70 is an aspherical meniscus lens.

Figure 5:
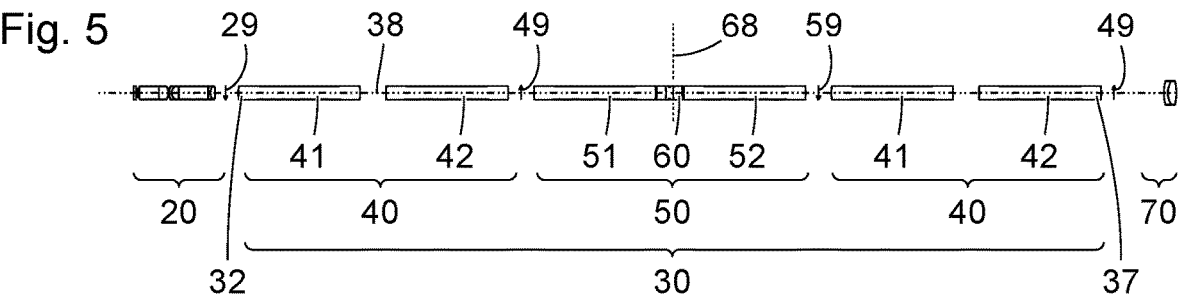
FIG. 5 shows a schematic illustration of a further observation system.

FIG. 5 shows a schematic illustration of an alternative configuration of an observation system 20, 30, 70, which is similar to the observation system illustrated by way of FIGS. 2 to 4 in terms of a few features, properties and functions, and can be used in an endoscope, as is illustrated in FIG. 1. Below, features, properties and functions of the relay lens system 30 of the observation system 20, 30, 70 shown in FIG. 5 will in particular be described, by way of which it differs from the relay lens system of the observation system illustrated by way of FIGS. 2 to 4.

The relay lens system 30 of the observation system 20, 30, 70 shown in FIG. 5 comprises two first imaging devices 40 and a second imaging device 50 between the two first imaging devices 40. The second imaging device 50 comprises, between two identical rod lenses 51, 52, a correction device 60 that differs from the correction device illustrated by way of FIG. 2.

Figure 6:
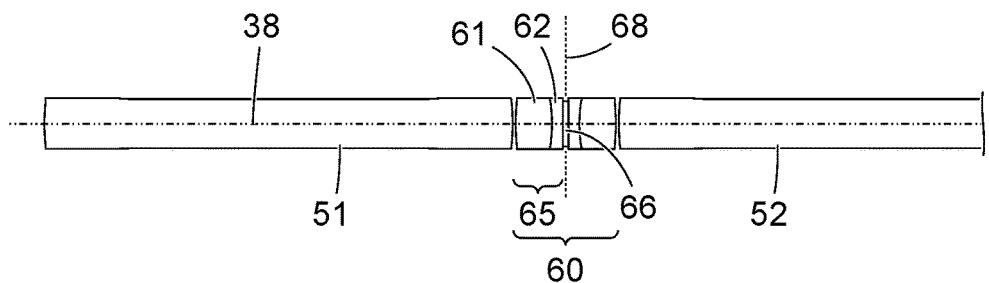
FIG. 6 shows a schematic illustration of a second imaging device of the observation system of FIG. 5.

FIG. 6 shows an enlarged illustration of part of the second imaging device 50, specifically the distal rod lens 51, the correction device 60, and part of the proximal rod lens 52. The correction device 60 comprises, similar to the correction device illustrated by way of FIG. 3, four lenses 61, 62 in two identical groups 65, which are arranged mirror-symmetrically with respect to a plane of symmetry 68 that is orthogonal with respect to the optical axis 38. The two groups 65 are attached, in contrast to the correction device illustrated by way of FIG. 3, to two surfaces of a plane plate 66 which are remote from one another. To this extent, the correction device 60 is formed from four lenses 61, 62 that are identical in each case in pairs and arranged mirror-symmetrically, and a plane plate 61 in a mechanical unit that forms a single, larger group.

Figure 7:
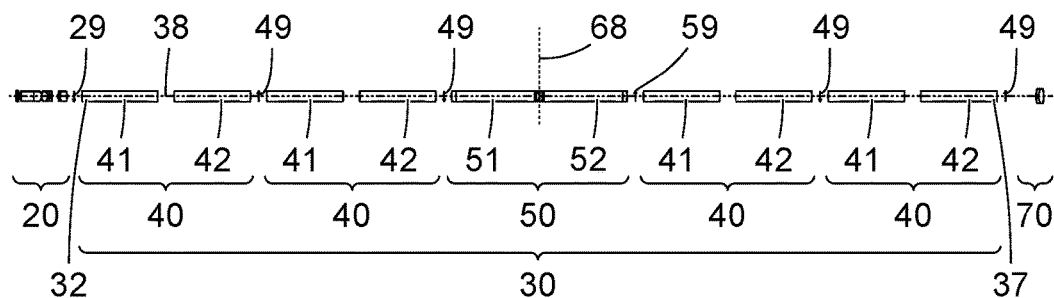
FIG. 7 shows a schematic illustration of a further observation system.

FIG. 7 shows a schematic illustration of a further observation system 20, 30, 70, which is similar to the observation systems illustrated by way of FIGS. 2 to 6 in respect of some features and properties and may be used in an endoscope, as is illustrated by way of FIG. 1. Below, features, properties and functions of the relay lens system 30 of the observation system 20, 30, 70, shown in FIG. 7 will be in particular described, by way of which it differs from the relay lens systems of the configurations as illustrated by way of FIGS. 2 to 6.

The relay lens system 30 of the observation system 20, 30, 70 shown in FIG. 7 differs from the relay lens systems as is illustrated by way of FIGS. 2 to 6 in particular in terms of the number of the first, undercorrected imaging devices 40. The relay lens system 30 shown in FIG. 7 has four first imaging devices 40. Two first imaging devices 40 are arranged distal to the second imaging device 50, i.e. between the objective 20 and the second imaging device 50. Two first imaging devices 40 are arranged proximal to the second imaging device 50, i.e. between the second imaging device 50 and the eyepiece 70.

The relay lens system 30 of the observation system 20, 30, 70 shown in FIG. 7 furthermore differs from the relay lens systems illustrated by way of FIGS. 2 to 6 in terms of the configuration of the second, overcorrected imaging device 50. The second imaging device 50 comprises two identical rod lenses 51, 52 which are arranged mirror-symmetrically with respect to the plane of symmetry 68, which is orthogonal to the optical axis 38 of the relay lens system 30. The entire relay lens system 30 is mirror-symmetric with respect to the plane of symmetry 68.

As in the relay lens systems illustrated by way of FIGS. 2 to 6, the first imaging devices in the relay lens system shown in FIG. 7 are also undercorrected, specifically uncorrected, and the second imaging device 50 is overcorrected. The second imaging device 50 corrects chromatic aberrations of at least one type (in particular longitudinal chromatic aberrations) of all first imaging devices 40, with the result that the entire relay lens system 30 is corrected at least with respect to this type of chromatic aberration.

Figure 8:
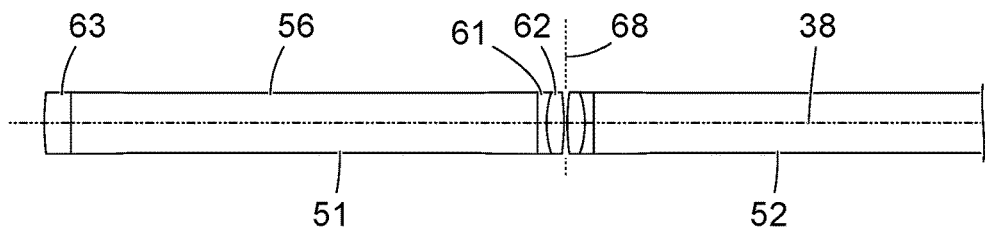
FIG. 8 shows a schematic illustration of a second imaging device of the observation system of FIG. 7.

FIG. 8 shows a schematically enlarged illustration of part of the second imaging device 50 of the relay lens system 30 shown in FIG. 7, specifically the distal rod lens 51 and part of the proximal rod lens 52.

The rod lenses 51, 52 are identical and are arranged mirror-symmetrically with respect to the plane of symmetry 68, which is orthogonal to the optical axis 38. Only the distal rod lens 51 will be described below.

The distal rod lens 51 in the illustrated example comprises a plane plate 56, i.e. an optically transparent body having two parallel planar light entry and exit surfaces. A first lens 61 is cemented to the proximal light exit surface of the plane plate 56. Cemented to the first lens 61 is a second lens 62 which forms the proximal light exit surface of the distal rod lens 51. Cemented to the distal light entry surface of the plane plate 51 is a third lens 63, which forms the light entry surface of the distal rod lens 51.

The plane plate 56 and the lenses 61, 62, 63 have different optically transparent materials, in particular glasses having different refractive indices and different Abbe numbers. The radii of curvature of all boundary surfaces, the thicknesses, the refractive indices and the Abbe numbers of the materials of the plane plate 56 and of the lenses 61, 62, 63 are selected such that the resulting chromatic aberration of the second imaging device 50 corrects or compensates for the chromatic aberrations of the first imaging devices 40.

The invention claimed is:

1. An endoscope having:
   a relay lens system comprising:
      a plurality of first imaging devices each having two lenses, wherein each first imaging device images a real intermediate image distal to the first imaging device into a further real intermediate image proximal to the first imaging device;
      a second imaging device arranged between the first imagine devices, wherein the second imagine device images a real intermediate image distal to the second imaging device into a further real intermediate image proximal to the second imaging device, the second imagine device having a correction device that is mirror-symmetric with respect to a plane of symmetry, which is orthogonal with respect to an optical axis of the second imagine device;
   wherein the first imaging devices each have a chromatic aberration, and
   wherein the chromatic aberrations of the first imaging devices are corrected by the correction device of the second imaging device.

2. The endoscope of claim 1, comprising more than one of said relay lens system.

3. The endoscope of claim 1, wherein the second imaging device has two rod lenses, and wherein the correction device is arranged between the two rod lenses for correcting the chromatic aberrations of the first imaging devices and chromatic aberrations of the rod lenses of the second imaging device.

4. The endoscope of claim 3, wherein each of the two rod lenses of the second imaging device is mirror-symmetric with respect to the plane of symmetry.

5. The endoscope of claim 3, wherein the correction device comprises a mirror-symmetric group of a plurality of lenses, which are cemented together.

6. The relay lens system according to claim 3, wherein the correction device comprises two identical and mirror-symmetrically arranged groups of lenses, which are cemented together.

7. The relay lens system according to claim 3, wherein the two lenses of each first imaging device comprise two rod lenses, wherein said two rod lenses of each first imaging device are identical to the rod lenses of the second imaging device.

8. A relay lens system for transmitting an image from a distal end of the relay lens system to a proximal end of the relay lens system, comprising:
   a plurality of first imaging devices each having two lenses, wherein each first imaging device images a real intermediate image distal to the first imaging device into a further real intermediate image proximal to the first imaging device;
   a second imaging device arranged between the first imaging devices, wherein the second imaging device images a real intermediate image distal to the second imaging device into a further real intermediate image proximal to the second imaging device, the second imaging device having a correction device that is mirror-symmetric with respect to a plane of symmetry, which is orthogonal with respect to an optical axis of the second imaging device;
   wherein the first imaging devices each have a chromatic aberration; and
   wherein the chromatic aberrations of the first imaging devices are corrected by the correction device of the second imaging device.

9. The relay lens system according to claim 8, wherein the second imaging device has two rod lenses, and wherein the correction device is arranged between the two rod lenses for correcting the chromatic aberrations of the first imaging devices and chromatic aberrations of the rod lenses of the second imaging device.

10. The relay lens system according to claim 9, wherein each of the two rod lenses of the second imaging device is mirror-symmetric with respect to the plane of symmetry.

11. The relay lens system according to claim 9, wherein the correction device comprises a mirror-symmetric group of a plurality of lenses, which are cemented together.

12. The relay lens system according to claim 9, wherein the correction device comprises two identical and mirror-symmetrically arranged groups of lenses, which are cemented together.

13. The relay lens system according to claim 12, wherein the two identical and mirror-symmetrically arranged groups are attached to surfaces of a plane plate that face away from one another.

14. The relay lens system according to claim 9, wherein the two lenses of each first imaging device comprise two rod lenses, wherein said two rod lenses of each first imaging device are identical to the rod lenses of the second imaging device.

15. The relay lens system according to claim 8, wherein one of the lenses of each first imaging device is a lens made of a glass having a refractive index that is not less than 1.60 and not greater than 1.65, and an Abbe number that is not less than 48 and not greater than 54.

16. The relay lens system according to claim 14, wherein the ratio between a diameter of the rod lenses of the first or second imaging device and a radius of curvature of the light entry and exit surfaces of the rod lenses of the first or second imaging device is not less than 0.3 and not greater than 0.55.

17. The relay lens system according to claim 15, wherein the lens is a rod lens.

18. The relay lens system according to claim 8, wherein the lenses are rod lenses.

* * * * *